United States Patent

Eggleton et al.

[11] Patent Number: 6,163,638
[45] Date of Patent: Dec. 19, 2000

[54] ARTICLE COMPRISING AN OPTICAL PULSE COMPRESSOR

[75] Inventors: Benjamin John Eggleton, Summit; Gadi Lenz, Fanwood, both of N.J.

[73] Assignee: Lucent Technologies Inc., Murray Hill, N.J.

[21] Appl. No.: 09/181,728

[22] Filed: Oct. 29, 1998

[51] Int. Cl.[7] ........................................................ G02B 6/34
[52] U.S. Cl. ............................... 385/37; 385/123; 359/161; 359/173; 372/25
[58] Field of Search .................... 385/37, 123; 359/154, 359/168, 173, 161, 188; 372/25, 30

[56] References Cited

U.S. PATENT DOCUMENTS

| | | | |
|---|---|---|---|
| 4,406,516 | 9/1983 | Hasegawa | 359/188 |
| 4,958,910 | 9/1990 | Taylor et al. | 359/327 |
| 5,477,375 | 12/1995 | Korotky et al. | 359/264 |
| 5,499,134 | 3/1996 | Galvanauskas et al. | 359/333 |
| 5,627,848 | 5/1997 | Fermann et al. | 372/18 |
| 5,815,307 | 9/1998 | Arbore et al. | 359/328 |
| 5,862,287 | 1/1999 | Stock et al. | 385/123 |
| 5,912,999 | 6/1999 | Brennan, III et al. | 385/37 |

OTHER PUBLICATIONS

L.F. Mollenauer, et al. "Solitons in High Bit–Rate, Long–Distance Transmission", *Optical Fiber Telecommunications IIIA*, pp 373–460, (1997).
S.V. Chernikov, et al. "Femtosecond soliton propagation in fibers with slowly decreasing dispersion", *J. of the Optical Society of America*, B, vol. 8(8), pp. 1633–1641, (1991).
P.V. Mamyshev, et al. "Generation of Fundamental Soliton Trains for High–Bit–Rate Optical Fiber Communication Lines", IEEE J. of Quantum Electronics, vol. 27(10), pp. 2347–2355, (1991).
S.V. Chernikov, et al. "Picosecond Soliton Pulse Compressor Based On Dispersion Decreasing Fibre", *Electronics Letters*, vol. 28(19), p. 1942 (1992).
S.V. Chernikov, et al. "Soliton pulse compression in dispersion–decreasing fiber", *Electronics Letters*, vol. 18(7), pp. 476, (1993).
S.V. Chernikov, et al. "Experimental demonstration of step–like dispersion profiling in optical fibre for soliton pulse generation and compression", *Electronics Letters*, vol. 30(5), p. 433 (1994).
S.V. Chernikov, et al. "70 Gbit/s Fibre Based Source Of Fundamental Solitons at 1550 nm", *Electronics Letters*, vol. 28(13), p. 1210 (1992).
B. J. Eggleton, et al. "Bragg Grating Solitons", *Physical Review Letters*, vol. 76(10), p. 1627 (1996).
B. J. Eggleton, et al. "Nonlinear pulse propagation in Bragg gratings", *J. Optical Soc. Of America* B, vol. 14(11), p. 2980(1997).
G. Lenz, et al. "Pulse compression using fiber gratings as highly dispersive non–linear elements", *J. Optical Soc. Of America*, vol. 15(2), p. 715, (1998).
N. M. Litchinitser, et al. "Fiber Bragg Gratings for Dispersion Compensation in Transmission: Theoretical Model and Design Criteria for Nearly Ideal Pulse Recompression", *J. Lightwave Technology*, vol. 15(8), p. 1303, (1997).

*Primary Examiner*—Hemang Sanghavi
*Assistant Examiner*—Sung H. Pak
*Attorney, Agent, or Firm*—Eugen E. Pacher

[57] ABSTRACT

Optical pulse compression is of importance in very high bit rate optical fiber communication systems. We are disclosing an adiabatic optical pulse compressor that can achieve substantial compression by means of a relatively short (e.g., about 100 cm) chirped periodic structure, exemplarily an apodized and chirped fiber Bragg grating. The input pulse to the periodic structure typically are not soliton pulses, but the passage through the periodic structure results in transformation of the pulses into substantially transform-limited soliton pulses that are available (typically after appropriate modification) for transmission through conventional optical fiber towards utilization means. The input pulses can be generated by any applicable method, e.g., by combining the cw outputs of two lasers that differ with regard to the frequency of their output.

11 Claims, 2 Drawing Sheets

ARTICLE COMPRISING AN OPTICAL PULSE COMPRESSOR

FIELD OF THE INVENTION

This application pertains to articles (e.g., an optical fiber communication system or an optical transmitter) that comprise means for compressing optical pulses.

BACKGROUND OF THE INVENTION

Soliton pulses propagating in optical fiber are well known. See, for instance, U.S. Pat. No. 4,406,516. Such solitons have been shown to be robust against a variety of perturbations, and consequently are being considered for high bit rate, long distance transmission in optical fiber communication systems. See, for instance, L. F. Mollenauer et al., *Optical Fiber Telecommunications* IIIA, J. P. Kaminow and T. L. Koch, editors, Academic Press, San Diego, 1997, especially pp 373–460.

As is well known, optical solitons propagating in a homogeneous medium (such as conventional optical transmission fiber) represent a balance between the medium's non-linearity and its dispersion. Standard optical solitons are solutions of the nonlinear Schrodinger equation.

It has been recognized that soliton pulses may be manipulated by providing a transmission medium with non-constant dispersion. See, for instance, S. V. Chernikov et al., *J. of the Optical Society of America*, B, Vol. 8(8), pp. 1633–1641, August 1991, and P. V. Mamyshev et al., *IEEE J. of Quantum Electronics*, Vol. 27(10). pp. 2347–2355, October 1991. The former reference discloses adiabatic soliton pulse compression in fiber with slowly decreasing dispersion. Experimental results on soliton pulse compression in optical fiber with decreasing dispersion are disclosed, for instance, by S. V. Chernikov et al., *Electronics Letters*, Vol. 28(19), p. 1842, September 1992; S. V. Chemikov et al., *Optics Letters*, Vol. 18(7), p. 476, April 1993; S. V. Chernikov et al., *Electronics Letters*, Vol. 30(5), p. 433, March 1994; and S. V. Chemikov et al., *Electronics Letters*, Vol. 28(13), p. 1210, June 1992.

Soliton compression is of interest for very high bit rate optical fiber communication systems because it can yield pulses of substantially lower pulse width than can be obtained by laser modulation. However, because of the inherently small dispersion in standard optical fiber, the typical lengths of the dispersion-decreasing fiber for picosecond soliton pulses are undesirably long, exemplarily a few kilometers. Thus, it would be advantageous to have available a technique for compression of optical pulses that yields soliton pulses and that does not include the use of long lengths of dispersion-decreasing fiber. This application discloses such a technique.

It is known that periodic media such as fiber Bragg gratings (FBGs) or photonic crystals can exhibit strong dispersion, especially in the spectral region close to the reflection band of the medium. Non-linear pulse evolution in periodic media has been studied by B. J. Eggleton et al., *Physical Review Letters*, Vol. 76(10), p. 1627, March 1996, and by B. J. Eggleton et al., *J. Optical Soc. of America* B, Vol. 14(11), p. 2980, November 1997. Fiber grating non-soliton pulse compressors are disclosed in G. Lenz et al., *J. Optical Soc. of America*, Vol. 15(2), p. 715, February 1998. See also U.S. patent application Ser. No. 08/989,093 filed Dec. 11, 1997 by B. J. Eggleton et al., and N. M. Litchinitser et al., *J. Lightwave Technology*, Vol. 15(8), page 1303, August 1997. FIG. 1 of the latter schematically shows a transmissive dispersion compensator for re-compression of non-soliton pulses.

GLOSSARY AND DEFINITIONS

A "soliton" pulse herein is a substantially transform limited optical pulse representing a balance between the effects of quadratic dispersion (e.g., nonlinearity present in the transmission medium, e.g., an optical fiber) and having the further property of being a solution of a nonlinear wave equation. It will be understood that non-linearity of the transmission medium is an inherent aspect of soliton pulses.

An optical pulse is a "transform limited" pulse if the product of its bandwidth and its temporal width are the minimum allowed by the Fourier time-frequency relations. Transform limited optical pulses may also be defined as chirp-free pulses.

An optical pulse herein is "substantially transform limited" if the product of its bandwidth and its temporal width is at most 10% larger than the minimum allowed by the Fourier time-frequency relations.

An "optical" pulse herein is an electromagnetic pulse of center wavelength in the visible or infrared spectral region, exemplarily about 1.5 $\mu$m.

Soliton pulse compression herein is "adiabatic" pulse compression if the variations in the effective amplification along the direction of propagation are gradual enough for the soliton to adjust itself with negligible loss of energy. The effective amplification length is much longer than the effective soliton period.

A periodic structure is "apodized" if one or both of its ends is designed to minimize the out-of-band reflection lobes in the spectrum (impedance matching of the periodic structure to the surrounding medium).

A periodic structure (e.g., an optical fiber grating) is "chirped" if its period, refractive index modulation or effective index (or any combination) are monotonically varied along the length of the structure.

The "width" of a pulse herein is the temporal width at half maximum (FWHM) of the intensity profile of the pulse.

A "photonic crystal" herein is a body having periodic modulation of the dielectric constant in one, two or three dimensions. The periodicity typically is half the optical wavelength in the body.

SUMMARY OF THE INVENTION

The invention is embodied in an article that comprises in a preferred embodiment a novel all-fiber optical pulse compressor that comprises a periodic structure. The discussion below is generally in terms of a particular periodic structure, namely, a chirped fiber Bragg grating. This is for convenience of exposition only, and does not imply a limitation to the use of a chirped fiber Bragg grating. Indeed, the use of other chirped periodic structures is contemplated. The compressor allows for adiabatic pulse compression in a relatively short section of optical fiber. The compressor typically comprises an apodized chirped fiber Bragg grating (FBG) or other periodic structure (e.g., chirped deep-etched grating, or another photonic crystal). Because the dispersion of such a structure (preferably a FBG) is easily tailored, the inventive pulse compressor is highly versatile. For instance, it does not require specialty fiber, and does not require splicing together many different fibers, to achieve the desired dispersion profile.

Specifically, the invention is embodied in an article (e.g., a soliton pulse generator or an optical fiber communication system) that comprises an adiabatic pulse compressor that comprises a dispersion element having adiabatically varying dispersion selected for providing compression of an input pulse of pulse width $\tau_i$ to a substantially transform-limited output soliton pulse of pulse width $\tau_o < \tau_i$.

Significantly, the adiabatically varying dispersion element comprises a chirped periodic structure selected to yield a substantially transform-limited soliton optical pulse of width $\tau_o < 0.5\tau_i$. The periodic structure preferably is a transmissive chirped FBG, but could be, for instance, another chirped photonic crystal.

In apparatus according to the invention, the input pulses can be provided by any appropriate means, e.g., a conventionally modulated laser, or by combining the cw outputs of two conventional lasers. The periodic structure typically is (but need not be) disposed close to the pulse generator, and the optical pulses at the input of the periodic structure typically are conventional (i.e., not soliton) optical pulses. During propagation through the periodic structure the pulses typically undergo a transformation such that, at least at the output of the periodic structure, the pulses are compressed, and are soliton pulses. If the input pulses are non-soliton pulses then interaction of the pulses with the periodic structure results in transformation into soliton pulses, and if the input pulses are soliton pulses then the pulses retain their soliton character during propagation through the periodic structure. In either case, the pulses at the output of the periodic structure are transform limited pulses (soliton pulses), of pulse width significantly less than the pulse width of the pulses at the input of the periodic structure (e.g., the FBG).

DETAILED DESCRIPTION

An optical soliton that is propagating in a longitudinally uniform medium (e.g., optical fiber) is an optical pulse wherein the effects of dispersion are balanced by the effects of non-linearity of the medium. The simplest soliton is the (N=1) fundamental soliton, and the discussion below will generally be in terms of fundamental solitons. Furthermore, the discussion below will generally be in terms of a chirped FBG. This is for simplicity of exposition only, and those skilled in the art will recognize that other periodic structures (e.g., a planar waveguide photonic crystal) can also be used.

The fundamental soliton obeys the following relation:

$$N = 1 = (L_D/L_{NL}) = (\tau^2/\beta_2)(1/\gamma P)^{-1} = (\gamma E \tau)\beta_2^{-1}, \quad (1)$$

wherein $L_D$ is the dispersion length, $L_{NL}$ is the nonlinear length, $\tau$ is the soliton pulse duration, $\beta_2$ is the quadratic dispersion at the center wavelength, P is the soliton peak power, E is the soliton energy, and $\gamma = (2\pi/\lambda)(n_2/A_{eff})$, where $\lambda$ is the center wavelength, $n_2$ is the nonlinear refractive index, and $A_{eff}$ is the effective mode area.

If, for instance, the soliton peak power P increases due to adiabatic change in gain the pulse width $\tau$ must decrease so that N remains fixed at 1. Similarly, if the dispersion decreases adiabatically (no loss or gain), the soliton must re-adjust itself by decreasing its pulse width. In other words, since $\gamma$ and E remain constant, if $\beta_2$ is reduced slowly, $\tau$ will follow these changes and decrease correspondingly to maintain the fundamental soliton condition.

As discussed above, if the pulse compressor is based on conventional optical fiber, the small fiber dispersion leads to large dispersion length and large fiber length (e.g., a few km) for significant compression (decrease in $\tau$) for picosecond pulses. This clearly is undesirable.

We have now recognized that much shorter pulse compressors are possible if the pulse compressor comprises a chirped periodic structure, for instance, a chirped optical fiber grating with characteristics (e.g., grating period $\Lambda$, refractive index variation $\Delta n$ or average effective refractive index n) that vary along the longitudinal axis of the grating.

Figure 1:
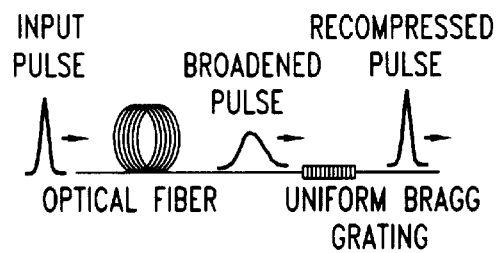
FIG. 1 schematically depicts a prior art pulse compressor.
Figure 2:
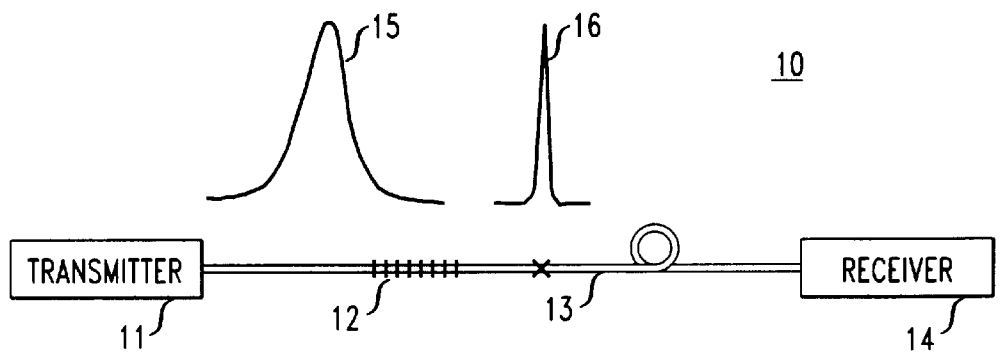
FIG. 2 schematically shows an exemplary optical fiber communication system according thy invention.

By way of example, FIG. 1 schematically shows a prior art pulse re-compressor, and FIG. 2 schematically shows an optical fiber communication system according to the invention.

In FIG. 1, the input pulse typically is produced by an optical transmitter, and typically is not transform limited. The pulse is transmitted through a substantial length (typically hundreds of kilometers) of optical transmission fiber, resulting in pulse broadening. The broadened pulse is then transmitted through a non-chirped fiber Bragg grating selected such that substantial pulse re-compression results. Desirably, the pulse width of the re-compressed pulse is substantially equal to the pulse width of the input pulse. Of course, the re-compressed pulse typically is also not transform limited, and can not have a pulse width less than the pulse width of the input pulse. In other words, the uniform FBG of the prior art pulse re-compressor at best removes the pulse broadening due to fiber dispersion.

FIG. 2 schematically shows an exemplary optical fiber communication system 10 according to the invention. Transmitter 11 produces optical pulses that typically are coupled into optical fiber and propagate therein towards chirped FBG 12. The distance between transmitter and grating is typically small. Pulses 15 will typically not be soliton pulses, but will be transformed into soliton pulses during transmission through chirped FBG 12. After transmission through the grating, the pulses will have become compressed transform-limited soliton pulses 16, of pulse width substantially less (e.g., ½ or less) than the pulse width of input pulses 15. The output soliton pulses 16 are then coupled into transmission fiber 13 and propagated therethrough to receiver 14. Of course, during propagation through the (typically hundreds or even thousands of kilometers of) transmission fiber the pulses 16 undergo attenuation and pulse spreading, typically requiring amplification in known manner. Amplifiers are not shown in FIG. 2. Furthermore, the output pulses, having very small (e.g., less than about 5 ps) pulse width, may require conditioning before they propagate through transmission fiber 13. For instance, soliton pulses 16 may be attenuated to avoid excessive non-linear effects.

Figure 3:
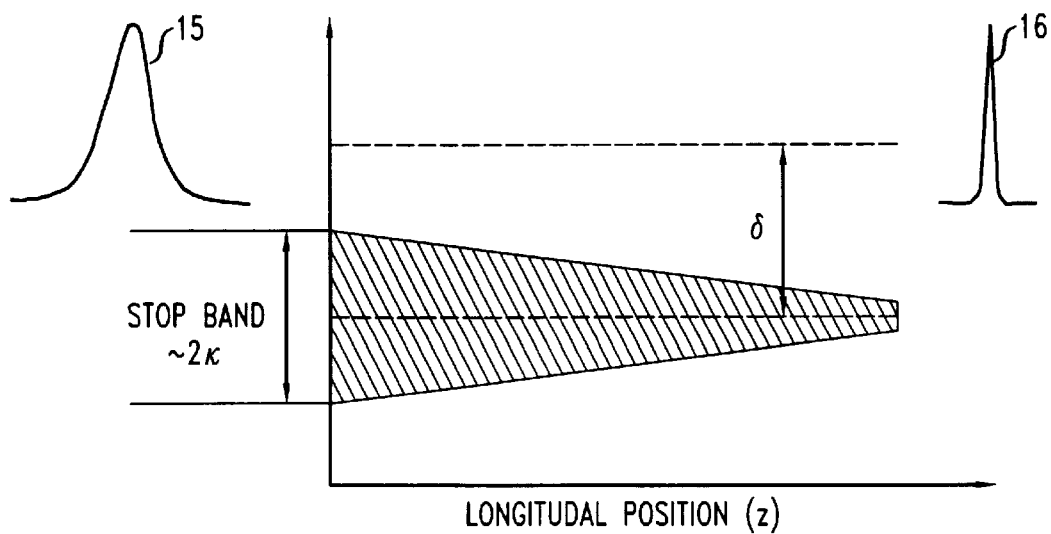
FIG. 3 schematically shows the stop hand frequency and de-tuning of an adiabatic pulse compressor according to the invention.

FIG. 3 shows the stop band frequency and de-tuning of an exemplary adiabatic pulse compressor, based on an apodized chirped FBG with refractive index modulation that decreases linearly along the grating. The stop band has approximate width $2\kappa$ at the input, decreasing steadily towards the output, whereas the de-tuning parameter $\delta$ is substantially constant. The parameters $\delta$ and $\kappa$ are defined as follows:

$$\delta = (n/c)(\omega - \omega_B), \text{ and}$$

$$\kappa = (\eta \Delta n \omega_B)/2c,$$

where c is the speed of light, $\omega$ is the radial frequency, $\omega_B$ is the radial Bragg frequency, $\eta$ is the fraction of the fiber mode that overlaps with the grating, and n and Δn are as defined above. The Bragg frequency $\omega_B$ is directly related to the period $\Lambda(z)$ and the average effective index n through $$\omega_B = \pi c/n\Lambda(z)$$

A calculation shows that the total pulse compression ratio $W_{eff}(L)$ is equal to $\beta_2(0)/\beta_2(L)$, and depends only on the effective quadratic dispersion at the endpoints of the grating, and is independent of the exact functional form of the dispersion, provided pulse propagation through the periodic structure is adiabatic. The change in dispersion has to be gradual enough such that the fundamental soliton is maintained, and energy loss to continuum radiation is negligible.

Figure 4:
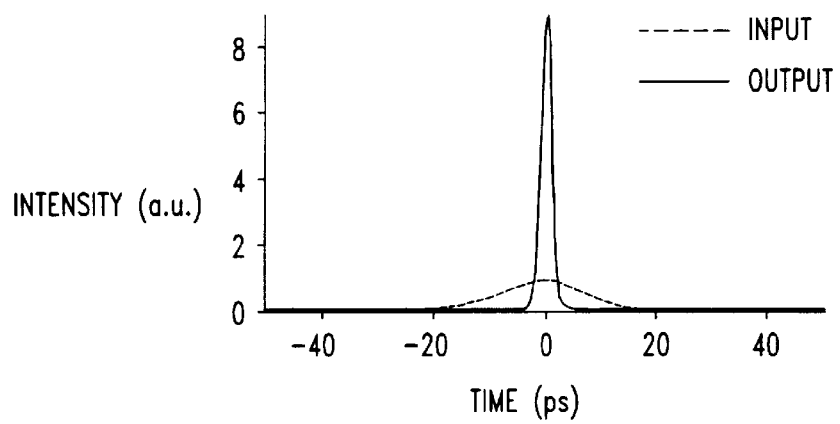
FIGS. 4 and 5 computed input and output pulses.

FIG. 4 schematically shows exemplary adiabatic soliton compression in a chirped (linearly tapered) grating, as determined by numerical simulation. With initial pulse width of 10 ps, the grating of length 120 cm yields a 1.1 ps output soliton pulse.

Figure 5:
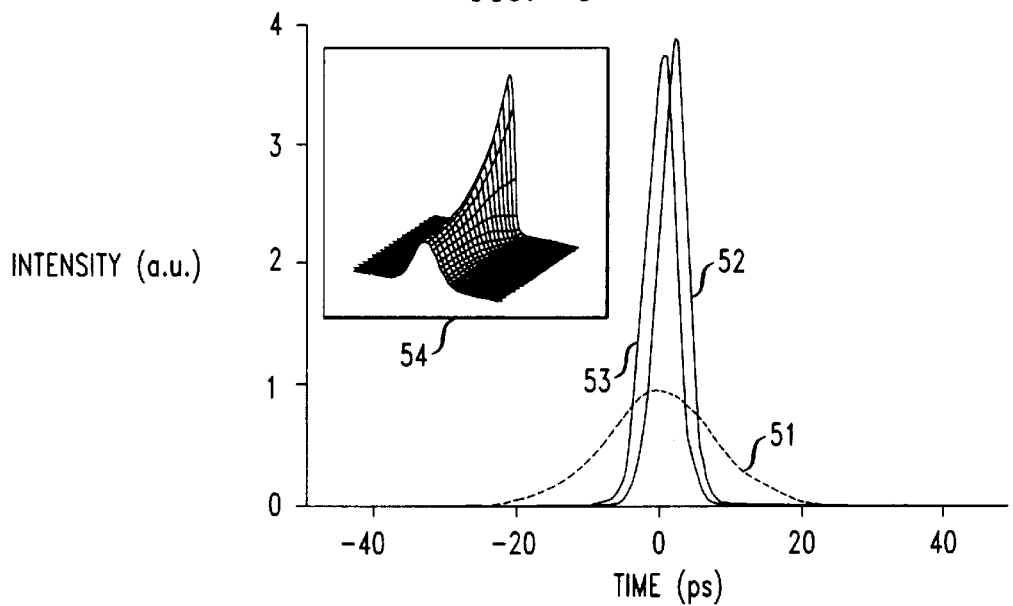

FIG. 5 shows results of a numeric simulation of adiabatic soliton compression in a 100 cm long chirped FBG. Numerals 51–53 refer, respectively, to the input pulse, the output pulse for non-zero cubic dispersion ($\beta_3$), and for $\beta_3=0$. Inset 54 shows the soliton evolution along the grating. The input pulse is a fundamental soliton, with pulse width of 17.6 ps. In the simulation, it was assumed that the chirped FBG has a linearly varying refractive index variation $\Delta n(z)$. The Bragg wavelength was set to 1.550 μm, and the fraction of the energy in the core η=0.8. The initial index modulation is 0.005, and the final modulation is 0.003. The quadratic dispersion at the end points is -5.546 ps²/cm and -1.494 ps²/cm, and the corresponding cubic dispersions are 6.613 ps³/cm and 1.468 ps³/cm. The grating was assumed to be apodized. The input pulse has electric field distribution $$E = \text{sech}(t/\tau_i), \text{ with } \tau_i = 10 \text{ ps}$$

corresponding to an intensity FWHM of 17.6 ps. Using $n_2 = 2.3 \times 10^{-16}$ cm²/W, and center wavelength λ=1.546 μm (which is de-tuned from $\omega_B$), the simulation showed that the required input intensity is 5.931 GW/cm². Assuming an effective mode area $A_{eff}=20$ μm², this input intensity corresponds to 1.19 kW peak power and, for a sech pulse, to an energy of 24 nJ. The compression factor was found to be about 3.7.

The above results were obtained for a linear decrease of $\Delta n(z)$ with increasing position coordinate z. The invention, however, is not so limited. For instance, another grating parameter (e.g., repeat distance Λ, or average refractive index n) can be varied, two or more grating parameters can be varied simultaneously, and/or the variation(s) has functional form other than linear. All such adiabatic variations of periodic structures are contemplated. The input pulses can be produced in any convenient manner. A currently preferred technique utilizes two lasers having continuous wave (cw) outputs that differ in frequency by a predetermined amount. Combining the two outputs results in a beat signal, with the modulation frequency of the beat signal being determined by the frequency difference of the laser outputs. The beat signal optionally is amplified or otherwise conditioned, before it is coupled into the chirped periodic structure.

Figure 6:
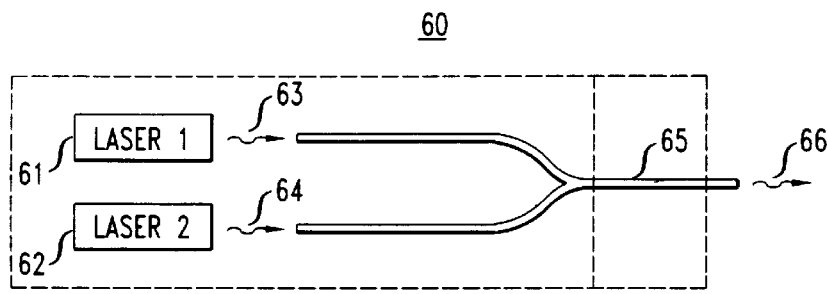
FIG. 6 schematically shows an exemplary pulse train generator, as known to the art.

FIG. 6 schematically depicts an exemplary pulse generator 60, which typically is incorporated into the transmitter. Laser 61 has cw output 63, and laser 62 has cw output 64, the cw outputs differing in frequency by a predetermined amount Δν and exemplarily having wavelength at or near 1.5 μm. The cw outputs are coupled into combiner 65 and are transformed into beat signal 66, with beat frequencies Δν.

Practice of the invention is not limited to the use of silica-based optical fibers. Other fiber or photonic crystal material, such as chalcogenide fiber, possess high non-linearity and may be used as periodic structure. Furthermore, the non-linearity is not limited to a third order non-linearity (such as the Kerr effect), and could be an "effective" third order non-linearity resulting from a cascade of second order non-linearities, known as cascaded $\chi^{(2)}$. Still furthermore, the varying parameter is not restricted to the second order dispersion, but may be the effective non-linear coefficient, or dispersion, or any combination thereof, since all of these can be shown to yield the same effect, namely, introduction of an effective amplification. However, the adiabatic condition must be maintained in all cases.

The invention claimed is:

1. An optical waveguide communication system comprising a transmitter, a receiver and an optical waveguide transmission link signal-transmissively connecting the transmitter and the receiver, said transmission link comprising a length of single mode optical transmission fiber and a pulse compressor, said pulse compressor comprising a dispersive element; wherein a) said dispersive element has adiabatically varying dispersion selected for providing compression of an input optical pulse of pulse width $\tau_i$ to an output optical pulse of pulse width $\tau_o < \tau_i$;

b) the dispersive element comprises a chirped transmissive periodic structure selected such that, during operation of the communication system, the output optical pulse is a substantially transform-limited optical pulse, with the chirped transmissive periodic structure selected such that an optical pulse that is being transmitted through the chirped transmissive periodic structure substantially obeys the equation $$\tau^2 = \beta_2/\gamma P$$

at a given point of said periodic structure, where τ is the pulse width at the given point, $\beta_2$ is the quadratic dispersion of the center wavelength of the pulse, $\gamma=(2\pi/\lambda)(n_2/A_{eff})$, where λ is the center wavelength of the pulse, $n_2$ is the nonlinear refractive index, $A_{eff}$ is the effective mode area, and P is the soliton peak power.

2. System according to claim 1, wherein the periodic structure is a chirped fiber Bragg grating.

3. System according to claim 2, wherein said chirped fiber Bragg grating has refractive index variations of an amplitude that varies monotonically along the length of the fiber Bragg grating.

4. System according to claim 2, wherein said chirped fiber Bragg grating has refractive index variations having a period that varies monotonically along the length of the fiber Bragg grating.

5. System according to claim 2, wherein said chirped fiber Bragg grating has an effective refractive index that varies monotonically along the length of the fiber Bragg grating.

6. Article according to claim 3, wherein two or more of the refractive index variation amplitude, refractive index variation period, and effective refractive index vary monotonically along the length of the fiber Bragg grating.

7. System according to claim 1, wherein the periodic structure is a chirped photonic crystal.

8. System according to claim 1, wherein said transmitter comprises a pulse generator for generating non-transform-limited optical pulses that are coupled into said optical pulse compressor for transformation into said substantially compressed transform-limited output pulses.

9. System according to claim 8, wherein said optical fiber communication system further comprises an optical pulse shaper disposed downstream of said compressor, said optical pulse shaper selected to shape said substantially transform-limited soliton output pulses into optical pulses suitable for transmission through said transmission path.

10. System according to claim 1, wherein said length of single mode transmission fiber is more than 100 km.

11. System according to claim 1, wherein the dispersive element is disposed upstream of said length of single mode optical fiber, where the upstream direction in the transmission link is the direction from the receiver towards the transmitter.

* * * * *